United States Patent [19]
Holt

[11] 4,432,334
[45] Feb. 21, 1984

[54] FOLDABLE GRID FOR COOKER

[76] Inventor: Jon R. Holt, 18212-24th Ave. North, Plymouth, Minn. 55447

[21] Appl. No.: 385,537

[22] Filed: Jun. 7, 1982

[51] Int. Cl.³ .......................... F24C 15/08; A47J 0/00
[52] U.S. Cl. .................. 126/9 B; 126/25 R; 99/449
[58] Field of Search ............... 126/19 R, 19 A, 25 R, 126/25 A, 41 R, 9 R, 9 A, 9 B, 163 R; 99/449, 422

[56] References Cited

U.S. PATENT DOCUMENTS

| | | | |
|---|---|---|---|
| 747,700 | 12/1903 | Grimm | 99/449 |
| 1,058,288 | 4/1913 | Brown | 126/9 B |
| 1,102,649 | 7/1914 | Dix | 126/9 B |
| 1,345,119 | 6/1920 | Biddle | 99/449 |
| 1,386,643 | 8/1921 | Mironchuk | 99/449 |
| 2,144,378 | 1/1939 | Wallace | 126/41 X |
| 2,323,916 | 7/1943 | Katz | 126/152 |
| 2,376,640 | 5/1945 | Wall et al. | 99/426 |
| 2,501,104 | 3/1950 | Smith | 99/449 |
| 2,614,514 | 10/1952 | Martindale et al. | 110/97 |
| 2,920,177 | 1/1960 | Brane | 126/41 A |
| 2,923,229 | 2/1960 | Halford | 99/339 |
| 2,986,138 | 5/1961 | Moore | 126/25 A |
| 3,613,553 | 10/1971 | Popeil | 99/426 |
| 3,624,741 | 7/1971 | Dills | 126/19 A |
| 4,223,818 | 9/1980 | Johnson | 224/45 E |

Primary Examiner—Samuel Scott
Assistant Examiner—G. Anderson
Attorney, Agent, or Firm—Burd, Bartz & Gutenkauf

[57] ABSTRACT

A barbecue cooker grid useable with a kettle of a cooker has two sections hinged together. Each section has a plurality of rods for supporting food. The rods have inner ends that are located adjacent each other. Outer rods and center rods have loop sections turned about pivot rods. The sections have cooperating rods which limit the pivoting of the sections relative to each other from a generally aligned position to a folded position.

15 Claims, 16 Drawing Figures

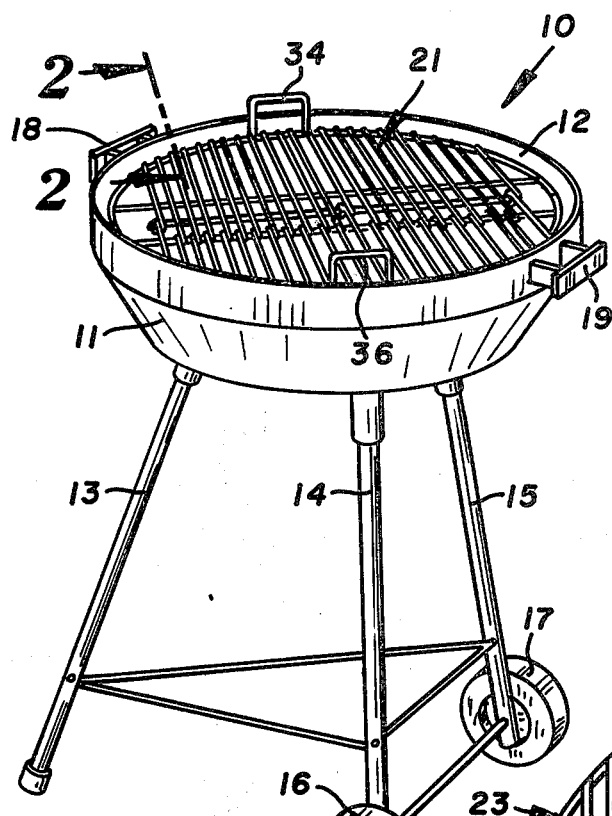
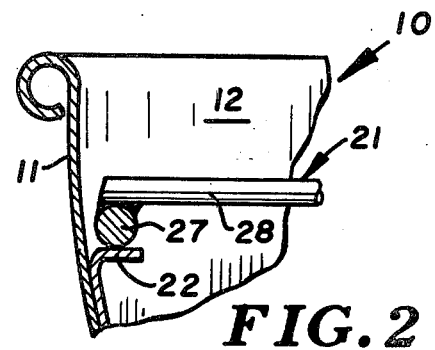
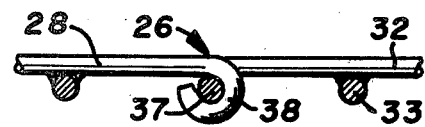
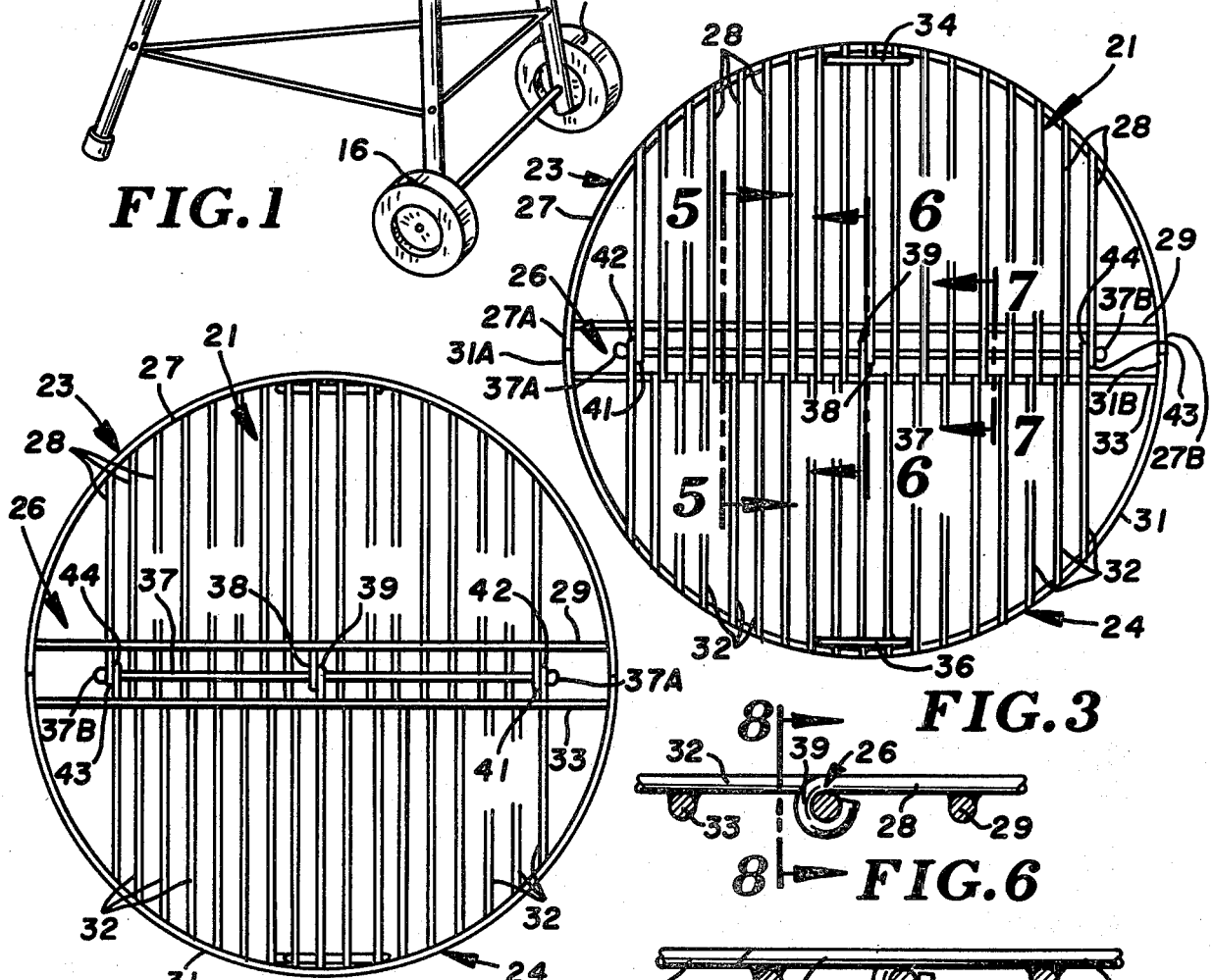
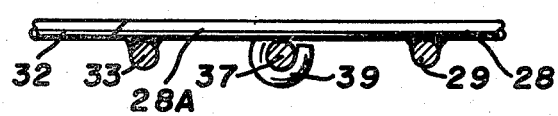

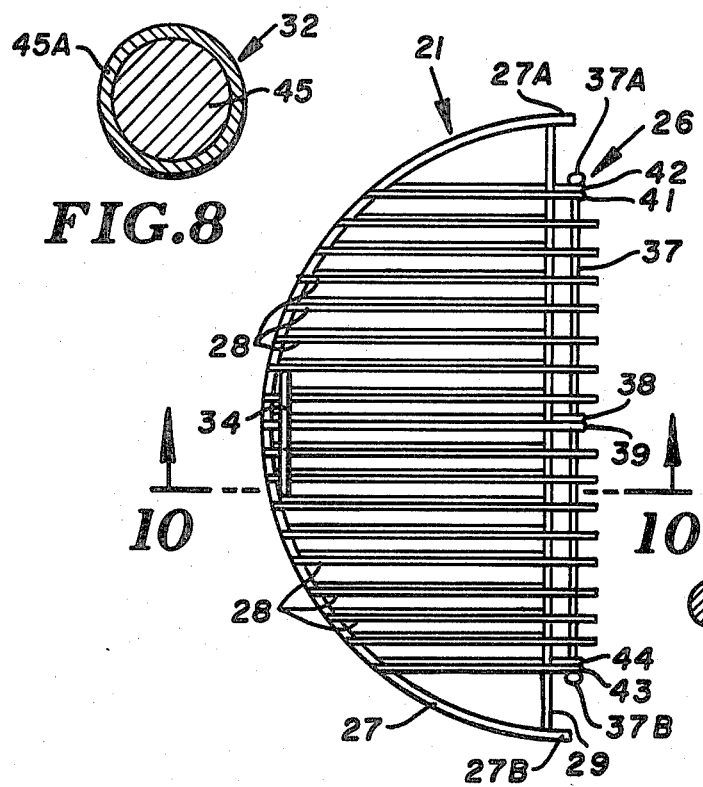
FIG.8
FIG.9
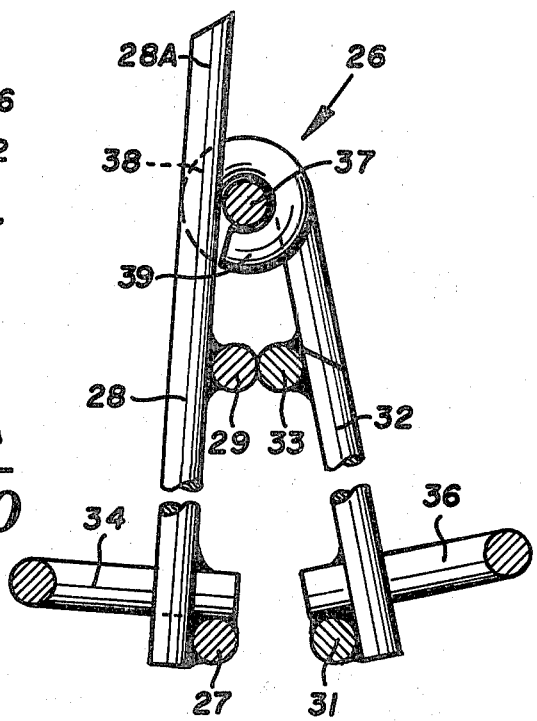
FIG.10
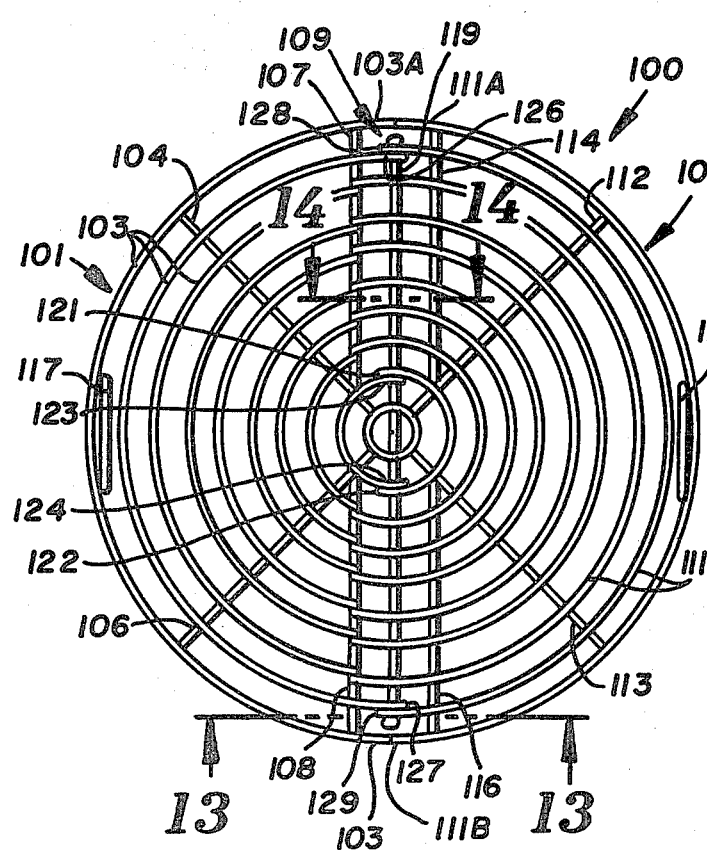
FIG.11
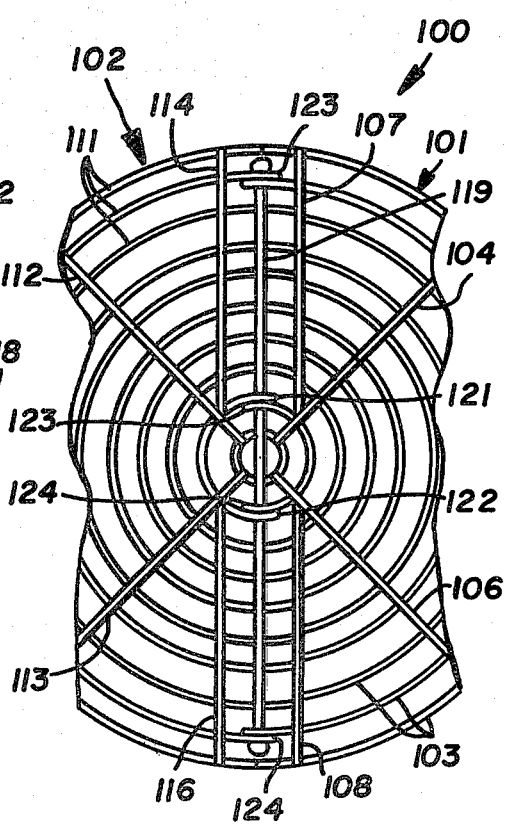
FIG.12

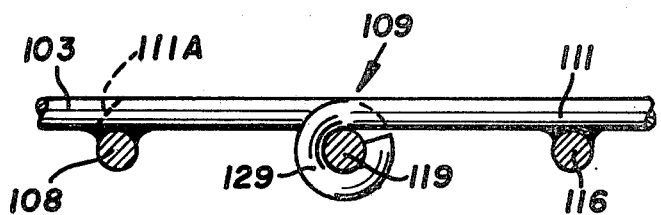
FIG.13
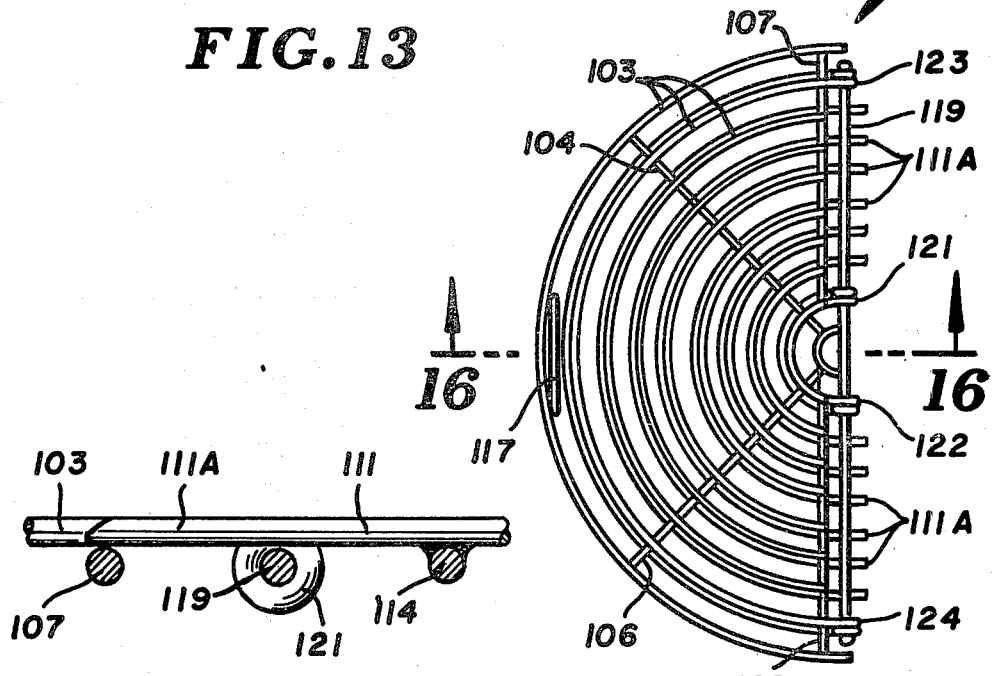
FIG.15
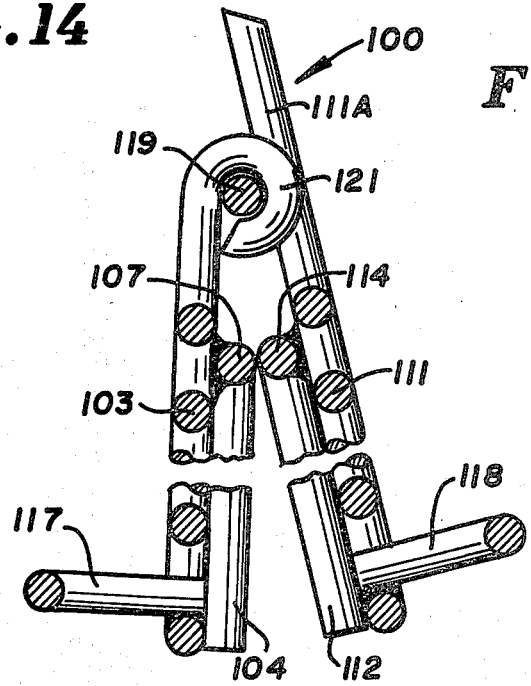
FIG.14
FIG.16

FOLDABLE GRID FOR COOKER

FIELD OF INVENTION

The invention is directed to grids used with cookers to support food above a source of heat.

BACKGROUND OF INVENTION

Cookers, known as barbeque grills, have grids used to support food above a source of heat, such as burning charcoal or a gas burner. The grids have a plurality of laterally spaced rods secured to a continuous circular rim. Handles on outer sections of the grids facilitate handling of the grids for cleaning and storage. An example of a portable cooker is shown in U.S. Pat. No. 3,538,906. This cooker has an open top kettle accommodating a one piece grate for combustible material, as charcoal, and a grid. The grid is a one-piece wire or rod unit having laterally spaced linear rods secured to a wire ring. The conventional grids have diameters of between 17 to 25 or more inches. The size of these grids prohibits cleaning of the grids in a self cleaning oven or dishwasher. The entire grid is removed from the kettle to provide access to the grate and allow convenient removal of the ashes from the kettle. The grid in use collects carbon, ash, and food particles. Scraping tools, brushes, wash cloths and cleaners are used to clean the grid before it is replaced in the kettle.

SUMMARY OF INVENTION

The invention is a grid assembly for use with a kettle of a food cooker, known as a barbeque grill. The grid assembly is an articulated grid structure having an open position and a folded position. The grid assembly has first and second grid mean pivotally connected to each other with a hinge means. The first and second grid means are located in alignment with others when they are in the open position. The open grid assembly fits in the kettle and is retained therein above the grate and heat source. The grid assembly is manually removed from the kettle and can be pivoted to a folded position.

The folded grid assembly is of a size to fit into a conventional self-cleaning oven whereby the heat of the oven cleans the grill assembly. Conventional Pyroletic ovens are periodically cleaned by turning the oven controls to the activate and cleaning cycle. During the cleaning cycle the temperature in the oven is between 850 to 900 degrees F. This high temperature carborizes all of the foreign material in the oven. When the folded grid assembly is placed in the oven, the high temperature efficiently cleans the grid assembly.

The preferred embodiments of the grid assembly of the invention have a pair of grid means with grid rods for supporting the food. The grid rods may have linear, semi-circular, square, rectangular, semi-oval and like shapes. The hinge means pivotally connecting the pair of grid means, includes a hinge rod and loop means located about the hinge rod. The loop means are turned ends of some of the grid rods. Each grid means has a transverse member secured to the grid rods. The ends of the grid rods that do not have loop means of one of the grid means engage the transverse member of the other grid means when the grid assembly is in the aligned open position. This limits the pivotal movement of the pair of grid means and maintains the open alignment of the pair of grid means.

The entire grid assembly is coated with a rust resistant and heat resistant and non-toxic material, such as a nickel chromium alloy. Other non-toxic materials can be used to protect the grid assembly from heat and chemical reactions, as rusting.

IN THE DRAWINGS

FIG. 1 is a perspective view of a coking apparatus having an articulated grid according to the invention.

FIG. 2 is an enlarged sectional view taken along the line 2—2 of FIG. 1;

FIG. 3 is an enlarged top view of the grid of FIG. 1;

FIG. 4 is a bottom view of the grid of FIG. 3;

FIG. 5 is an enlarged sectional view taken along the line 5—5 of FIG. 3;

FIG. 6 is an enlarged sectional view taken along the line 6—6 of FIG. 3;

FIG. 7 is an enlarged sectional view taken along the line 7—7 of FIG. 3;

FIG. 8 is an enlarged sectional view taken along the line 8—8 of FIG. 6;

FIG. 9 is a top view of the grid of FIG. 3 in its folded position;

FIG. 10 is an enlarged foreshortened sectional view taken along the line 10—10 of FIG. 9;

FIG. 11 is a top view of a modification of the grid of the invention;

FIG. 12 is a partial bottom view of FIG. 11;

FIG. 13 is an enlarged sectional view taken along the line 13—13 of FIG. 11;

FIG. 14 is an enlarged sectional view taken along the line 14—14 of FIG. 11;

FIG. 15 is a top view of the grid of FIG. 11 in its folded position; and

FIG. 16 is an enlarged foreshortened sectional view taken along the line 16—16 of FIG. 1.

DESCRIPTION OF PREFERRED EMBODIMENTS

Referring to FIG. 1, there is shown a cooking apparatus known as a barbecue grill indicated generally at 10 used for cooking food, such as hot dogs, hamburgers, chicken, steak, and the like. Cooker 10 has an open top housing or kettle 11 surrounding a chamber 12 accommodating the heat source, such as burning charcoal. Kettle 11 is supported in an elevated position above the ground with a plurality of legs 13, 14 and 15. Wheels 16 and 17 are rotatably mounted on the lower ends of legs 14 and 15 to facilitate the movement of the cooker on the ground. A pair of handles 18 and 19 are secured to opposite portions of kettle 11 to facilitate the movement of the cooker.

An articulated grid assembly indicated generally at 21 is located within the upper portion of kettle 11 for supporting the food above the heat source. Kettle 11 has a plurality of inwardly directed brackets 22 which support the grid assembly 21 in the upper portion thereof. Other types of support structures can be used to retain grid assembly 21 is assembled relation with kettle 11. The grid assembly 21 can be removed from the top of housing 11, as hereinafter described.

Grid assembly 21 has semi-circular shaped first and second sections indicated generally at 23 and 24 articulately connected together with a hinge assembly indicated generally at 26. Hinge assembly 26 is located along a generally diametrical plane separating the linear portions of the semi-circular shaped sections 23 and 24. As shown in FIGS. 9 and 10, hinge assembly 26 permits sections 23 and 24 to be pivoted to a folded generally back-to-back position and thereby reducing the overall length of grid assembly. The size of grid assembly 21 in one direction in its folded position is about one half of the diameter of the grid assembly.

The first section 23 of the grid assembly has a semicircular rim 27 secured by resistant welding or the like to a plurality of linear rods 28. Rods 28 are laterally spaced from each other and extend from rim 27 past the diametric plane intersecting the ends 27A and 27B of rim 27. Rods 28 can be ⅛ inch diameter metal rods. Adjacent rods are parallel to each other and spaced ⅝ inch apart. Other rod size and lateral spacing can be used. A chord rod 29 is secured by resistant welding or the like to the bottom of the rods 28 to space the inner ends of the rods from each other. The chord rod 29 is laterally spaced from and generally parallel to hinge assembly 26. The opposite ends of rod 29 are secured to rim 27.

The second section 24 of grid assembly 21 has a semicircular rim 31 having ends 31A and 31B located adjacent the ends 27A and 27B of rim 27. Rims 27 and 31 form a circle when grid assembly 21 is in its extended or open position, as shown in FIGS. 3 and 4. A plurality of rods 32 joined to rim 31 extend therefrom toward the center of the grill assembly. A chord rod 33 is secured to the inner end sections of the rods 32. Chord rod 33 is generally parallel to and laterally spaced from hinge assembly 26. The opposite ends of rod 33 are secured to rim 31.

Grid sections 23 and 24 have handles 34 and 36 used to facilitate the placing of grid assembly 21 into kettle 11 and the removal of the grill assembly therefrom. Handles 34 and 36 are generally inverted U-shaped rod members that are secured to the mid-sections of rims 27 and 31.

Hinge assembly 26 comprises an elongated linear hinge rod 37 located along the diametrical plane between the first grid section 23 and second grid section 24. The center rods 28 and 32 have center loops or downwardly reversed turned ends 38 and 39, as shown in FIGS. 5 and 6, that are turned over or around the center of hinge rod 37. The outside rods 28 and 32 on either side of the grid assembly have end loops 41, 42, 43 and 44 that are turned about the opposite ends of hinge rod 37. The end loops 41, 42, 43 and 44 are identical to loops 38 and 39, shown in FIGS. 5 and 6. Loops 38, 39, 41, 42, 43 and 44 form with the hinge rod 37 an articulated hinge wherein the grid sections 23 and 24 pivot about the longitudinal axis of hinge rod 37. The opposite ends 37A and 37B of hinge rod 37 are enlarged or bent to maintain hinge rod 37 in assembled relation with the end loops 41, 42, 43 and 44. Other retainer means, such as C-rings, pins or cotter pins can be used to hold hinge rod 37 in assembled relation with loops 41, 42, 43 and 44. Hinge assembly 26 permits the grid sections 23 and 24 to be pivoted from their open or aligned positions, as shown in FIGS. 3 and 4, to a folded position, as shown in FIGS. 9 and 10. Grid sections 23 and 24 each pivot slightly less than 90 degrees. When grid sections 23 and 24 are in their folded positions, chord rods 29 and 33 can engage each other and function as stops, which laterally space rods 28 and 32 and rims 27 and 31.

As shown in FIGS. 1, 3 and 4, grid assembly 21 is in its open or aligned position. Rods 28 and 32 are located in the same plane, shown in FIG. 1 as a horizontal plane. Grid sections 23 and 24 are aligned with each other. In other words, the grid sections 23 and 24 do not slop toward or away from each other. As shown in FIG. 7, rod 28 has an inner end 28A located in engagement with cord rod 33 to limit pivotal movement of the grid sections 23 and 24 relative to each other. In other words, chord rod 33 functions as a stop for rod end 28A. All of rods 28 except the end rods and middle rod have ends that contact chord rod 33 when grid assembly 21 is in the open position.

Referring to FIG. 8, rod 32 has a cylindrical core 45 of cold rolled steel and a coating or covering 45A. Preferably, covering 45A is of a material that is rust-resistant and heat-resistant. An example of coating 45A is a nickel chromium alloy that has been flash-plated onto core 45. The entire grid assembly 21 including rims 27 and 31, all of the rods 27, 28, 29, 31, 32, and 33 and handles 34 and 36 are coated to inhibit the rusting of the grid assembly 21. An example of a coating for the rim, rod, handle, and hinge parts of grid assembly is a nickel coating with a chromium flash. The chromium flash chemically hardens the nickel without impairing its rust-resistant characteristics. Other types of coatings, including ceramics, may be used to protect the parts of the entire grid assembly 21. The entire grid assembly 21 can be made of stainless steel and metals or reinforced ceramic materials that are rust-resistant and heat-resistant.

Referring to FIGS. 11 and 12, there is shown a modification of the grid asssembly of the invention indicated generally at 100. Grid assembly 100 is adapted to fit into kettle 11 and rest on brackets 22. Grid assembly 100 has a first grid section 101 and a second grid section 102 articulately connected together along a diameter line with a hinge assembly indicated generally at 109. Grid assembly 101 has a plurality of concentric semi-circular rods 103 secured by resistant welding or the like to a pair of radial support rods 104 and 106 and cord rods 107 and 108. Support rods 104 and 106 are disposed at generally right angles to each other. Chord rods 107 and 108 are generally parallel and laterally disposed relative to the hinge assembly 109. Additional radial support rods can be used to support the concentric semi-circular rods 103.

The second grid section 102 has a plurality of concentric semi-circular rods 111 secured to a pair of radial support rods 112 and 113 and aligned chord rods 114 and 116. Chord rods 114 and 116 are generally parallel and laterally spaced from hinge assembly 109.

Each of the concentric semi-circular rods 103 and 111 have adjacent ends 103A. 103B and 111A, 111B, as shown in FIG. 11. The ends 103A and 111A of outer rods 102 and 111 abut each other. When grid sections 101 and 102 are in the open position the outer rods 103 and 111 form a circle of a size that fits into kettle 11 and rests on brackets 22. A pair of handles 117 and 118 are secured to the outer rods 103 and 111 of grid sections 101 and 102. Handles 117 and 18 facilitate the removal and insertion of grid assembly 100 relative to kettle 11.

Hinge assembly 109 has an elongated linear hinge rod 119. Central semi-circular rods 103 and 111 have center loops 121, 122, 123 and 124 that are turned about hinge rod 119. Semi-circular rods 103 and 111 adjacent the outer rods have end loops 126, 127, 128, and 129 also turned about hinge rod 119. Loop 124 is shown in FIG. 13. All of the loops are similar to loop 124, shown in FIG. 13 to articulately hinge the first grid section 101 to the second grid section 102 for movement about the longitudinal axis of hinge rod 119 between its open position and folded position. The opposite ends of rod 119 are enlarged or bent to retain rod 119 in assembled relation with end loops 128 and 129. Other retainers can be used to limit longitudinal movement of rod 119 relative to the hinge loops 121–124 and 126–129.

Grid assembly 100 can be collapsed to a folded position, as shown in FIGS. 15 and 16. The first and second sections 101 and 102 pivot about hinge rod 119 until chord rods 108 and 116 engage each other. When the grid assembly 101 is in the folded position, it has a size of approximately one-half of its extended or open size.

The rods and handle of the grid assembly 100 are preferably coated with a rust-proof heat-resistant material, such as the materials shown and described with regard to FIG. 8. Other types of coatings can be used to protect the metal rods and parts from rust. Also, the entire grill can be made of a rust-proof material, such as stainless steel or reinforced ceramic materials.

The conventional grid for a barbecue cooker has a circular wire structure carrying a plurality of laterally spaced rods. These grills have a diameter between 17 to 25 inches. During use, the grills accumulate food particles, which must be periodically cleaned. Grid cleaning hand tools and various cleansers are used to remove the food particles from the grids. The grid assemblies 21 and 100 of the invention are foldable structures having durable finishes, which allow the grid assemblies to be placed in and cleaned in a dishwasher or self-cleaning oven, such as a Pyroletic oven. When the grid assembly is placed in the Pyroletic oven and the oven is turned to its cleaning cycle, the high temperatures, 850–900 degrees F. carborize all of the material on the grid assembly. The self-cleaning characteristics of a Pyrotetic oven are used to clean the entire grid assembly without effecting the rust proof characteristics of the material of the rid assembly.

While there is shown and described the preferred embodiments of the grid assembly of the invention, it is understood that changes in the structures, shapes of the structures, and materials may be made by those skilled in the art without departing from the invention. For example, the grids can be square, rectangular, oval, or generally U-shaped. The grids can have one or more hinge means allowing the grids to be pivoted to a folded position. The invention is defined in the following claims.

The embodiments of the invention in which an exclusive property or privilege is claimed are defined as follows:

1. A grid assembly for use with a cooker comprising: first grid means having first rods for supporting food, second grid means having second rods for supporting food, and hinge means pivotally connecting the first grid means to the second grid means, said first and second grid means being movable relative to each other, between an aligned open position and a folded position, wherein said first and second grid means are in spaced side-by-side positions, said hinge means including a hinge rod permanently connected to a plurality of said first and second rods to pivotally mount said plurality of first and second rods on said hinge rod, a first transverse member secured to said first rods adjacent on side of the hinge rod, said second rods having end sections engageable with the first transverse member when the first and second grid means are in the aligned position, a second transverse member secured to said second rods adjacent said hinge rod and on the side opposite said one side of the hinge rod, said first transverse member being engageable with the second transverse member when the first and second grid means are in the folded position to locate the first and second grid means in said spaced side-by-side positions.

2. The grid assembly of claim 1 wherein: each grid means has a semi-circular rim, said first and second rods comprising a plurality of linear rods secured to said rim, and said first and second members each comprising a transverse rod extended between said secured adjacent the ends of said semi-circular rim.

3. The grid assembly of claim 1 wherein: said means connected to a plurality of the first and second rods comprise loop means located about said hinge rod.

4. The grid assembly of claim 1 wherein: the first rods and second rods each include a plurality of generally semi-circular concentric rods, adjacent concentric rods being spaced from each other, and said first and second members comprising transverse rod means secured to said semi-circular rods.

5. The grid assembly of claim 1 wherein: each grid means include a heat-resistant coating means for inhibiting rust.

6. A grid assembly for use with a cooker comprising: first grid means having a plurality of first rods for supporting food, said first rods having first ends, second grid means having a plurality of second rods for supporting food, said second rods having second ends, a first member secured to said first rods adjacent the first ends, a second manner secured to said second ends of some of the second rods, a hinge rod located between the first and second members, at least two of said first ends having loops located about the hinge rod, and at least two of said second ends having loops located about the hinge rod whereby the first and second grid means are pivotally connected to each other, said first ends being engageable with said second member to limit pivotal movement of the first and second grid means to an open position and locate the first and second rods in generally the same plane, said first and second grid means being movable from the open position to a folded position wherein the first and second grid means are located in spaced side-by-side positions, said first member and second member being laterally and equally spaced from the hinge rod, whereby said first and second members are in engagement with each other when the first and second grid means are in the folded position to locate the first and second grid means in said spaced side-by-side positions.

7. The grid assembly of claim 6 including: handle means secured to each of the grid means to assist in manual movement of the grid assembly.

8. The grid assembly of claim 6 wherein: said first rods and second rods are each linear rods.

9. The grid assembly of claim 8 wherein: said first member is a first support rod secured to each of the linear rods of the first rods, and said second member is a second support rod secured to each of the linear rods of the second rods.

10. The grid assembly of claim 8 wherein: said linear rods include outer end rods and center rods, said outer end rods and center rods having said loops located about the hinge rod.

11. The grid assembly of claim 8 wherein: each of said first and second grid means includes rim means, each of said linear rods being secured to its associated rim means.

12. The grid assembly of claim 6 wherein: said first grid means and second grid means have a heat-resistant coating means for inhibiting rust.

13. The grid assembly of claim 6 wherein: said first rods and second rods each comprise a plurality of arcuate generally concentric rods.

14. The grid assembly of claim 13 wherein: said concentric rods include outer end rods and center rods, said outer end rods and center rods having said loops located about the hinge rod.

15. The grid assembly of claim 13 including: a plurality of generally radial support rods secured to the concentric rods.

* * * * *